United States Patent [19]

Thornton

[11] 3,997,873

[45] Dec. 14, 1976

[54] MULTITERMINAL MONITORING SYSTEM

[75] Inventor: Douglas R. Thornton, Maywood, Ill.

[73] Assignee: Manitou Systems, Inc., Bensenville, Ill.

[22] Filed: Mar. 31, 1975

[21] Appl. No.: 563,382

[52] U.S. Cl. .................... 340/149 R; 235/92 AC; 235/92 PD; 340/150

[51] Int. Cl.² .................... G06F 7/00; H04Q 9/00

[58] Field of Search ............. 340/149 A, 150, 151, 340/152 R; 346/14, 34; 235/92 AC, 92 PD; 194/4 R, DIG. 6, 10, 15; 221/2

[56] References Cited

UNITED STATES PATENTS

| | | | |
|---|---|---|---|
| 3,187,334 | 6/1965 | Humphrey | 346/34 |
| 3,427,441 | 2/1969 | Swords | 235/92 AC |
| 3,648,020 | 3/1972 | Tateisi et al. | 235/61.7 B |
| 3,648,243 | 3/1972 | Wiggins | 340/147 R |
| 3,691,527 | 9/1972 | Yamamoto | 340/149 A |
| 3,786,421 | 1/1974 | Wostl et al. | 340/147 A |
| 3,813,157 | 5/1974 | Fantozzi | 235/92 SB |
| 3,858,181 | 12/1974 | Goldsby et al. | 340/150 |
| 3,872,282 | 3/1975 | Long | 235/92 AC |

*Primary Examiner*—Donald J. Yusko
*Attorney, Agent, or Firm*—Neuman, Williams, Anderson & Olson

[57] ABSTRACT

Apparatus for controlling and recording the use of a plurality of photocopiers are disclosed. The apparatus includes a terminal associated with each of the photocopiers and a central recorder connected to each of the terminals. Each authorized user of the photocopiers is issued a badge having user identification information encoded thereon. The information on the badge is read at the terminal and transmitted to the central recorder before the copier is used while counts made at the terminal and representing the copies made are transmitted to the central recorder after the user has completed making his copies. A communication link between an individual terminal and the central recorder is only required immediately prior to and following the use of the copier by each user.

11 Claims, 5 Drawing Figures

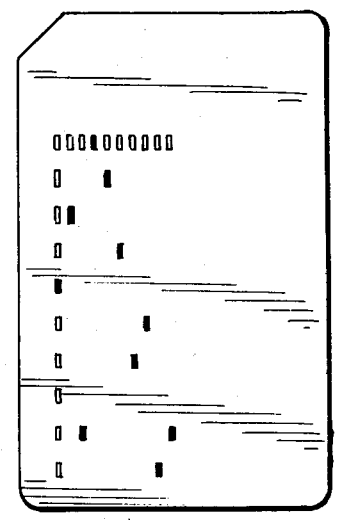
FIG. 3
FIG. 5
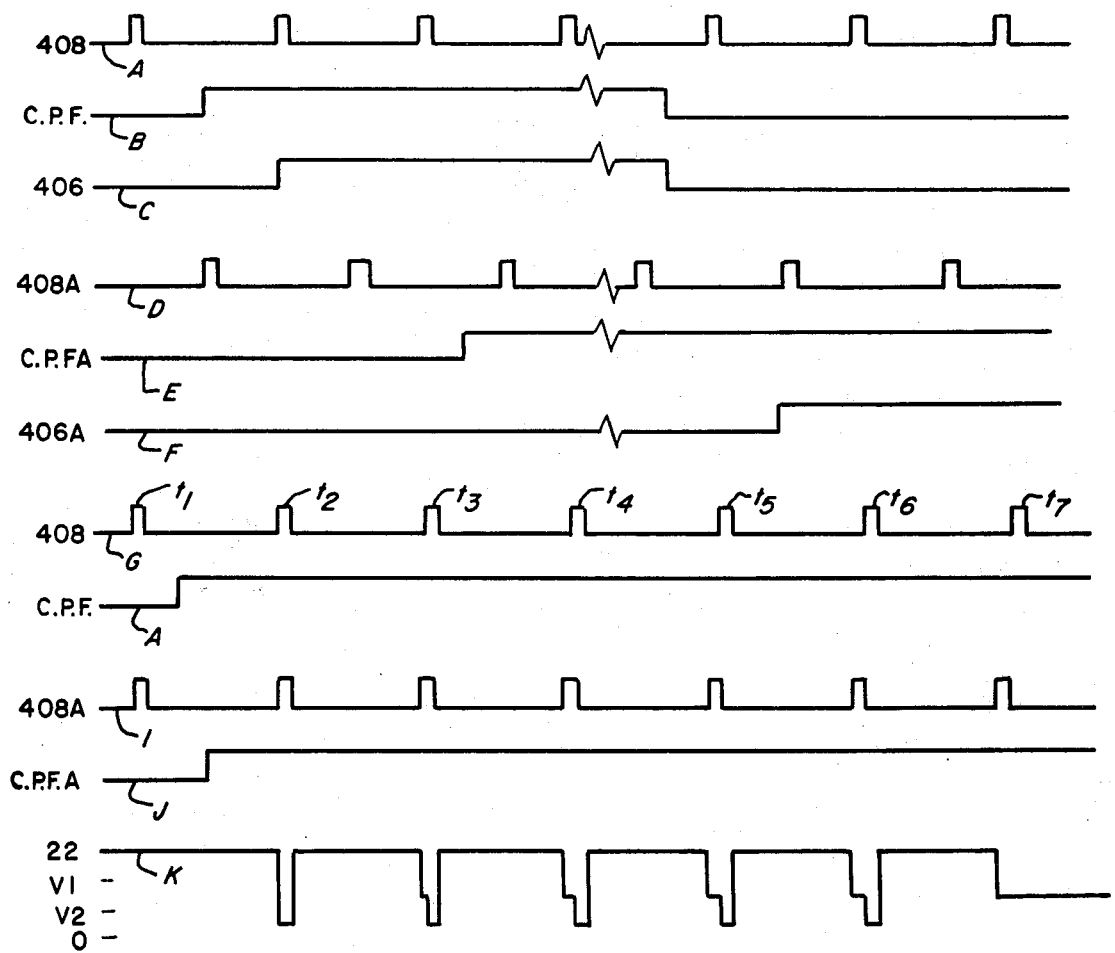

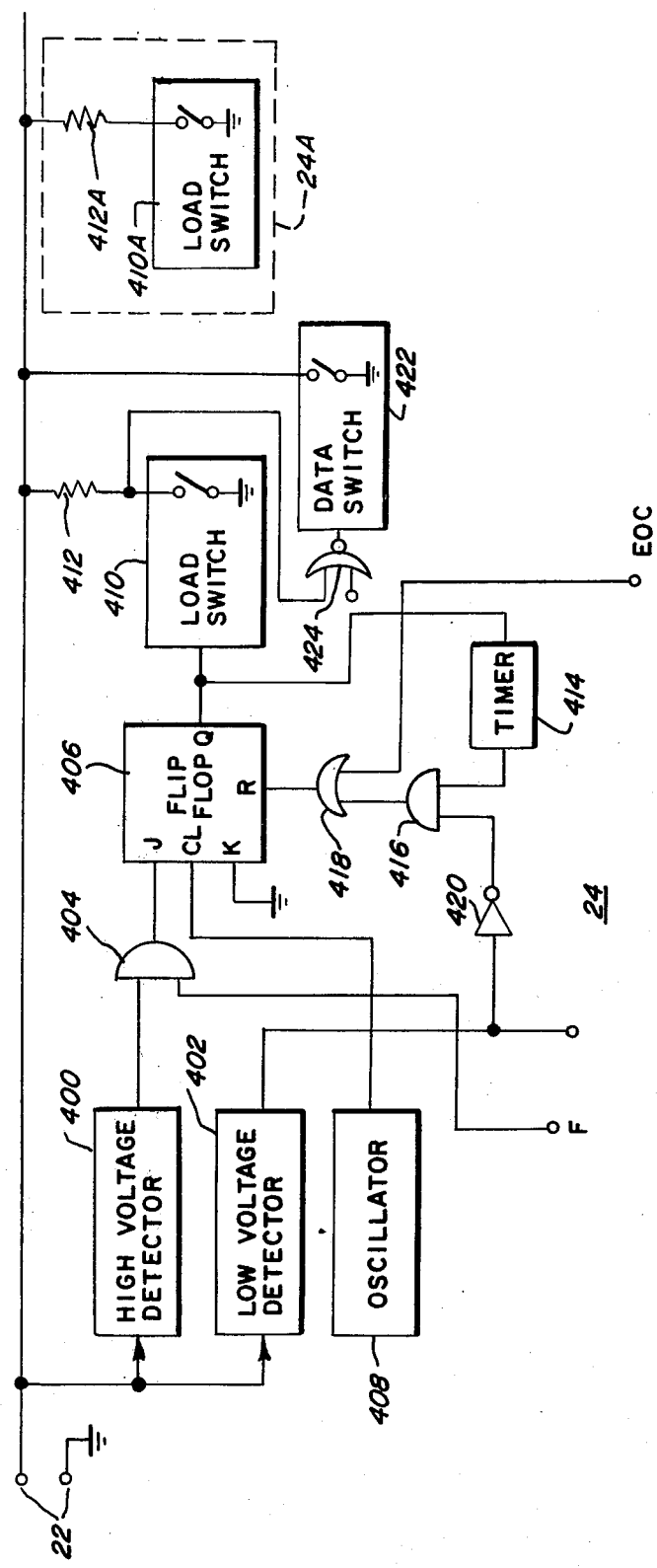

MULTITERMINAL MONITORING SYSTEM

BACKGROUND OF THE INVENTION

Apparatus for monitoring the use of various associated devices are well known. Such monitoring apparatus may be used to both control the use of the associated device so that unauthorized personnel may not make use thereof and to record the number of times or the length of time the associated device is used. One particular application where such apparatus has found particular usefulness is in association with photocopy machines. Thus, it is often desirable to insure that only properly authorized personnel are permitted to use photocopy machines and that when a particular user does make use of a machine, the number of copies he makes is accurately recorded. Recording of the number of copies made has at least two beneficial effects. It allows the costs of operating a photocopy machine to be properly allocated among the users thereof and it often has the psychological benefit of inhibiting the making of needless copies.

However, the monitoring apparatus previously known have had a number of disadvantages associated therewith. Those available for use with photocopy machines have been particularly undesirable. For example, one common system makes use of electrically operated mechanical counters. In order for the user to operate a copying machine, he must insert a counter into a receptacle in a terminal associated with the copying machine. Each time a copy is made, the counter is advanced by one. The counters, of course, are relatively bulky and inconvenient to carry on one's person. Moreover, supplying each authorized user with his own counter is often prohibitively expensive, so that one counter must be made to do for an entire department. Every time it is desired to make an accounting of the copies made, all the counters must be physically examined and the results manually recorded. Another common system includes a plurality of counters as a part of a terminal associated with each photocopy machine. Each terminal has a lock associated therewith which must be operated by, for example, a key. In order to enable the copier to operate, one of the locks must be operated. Whenever a copy is made, the counter associated with the operated lock is advanced. This system has the disadvantage that only a relatively small number of counters can be accommodated in each terminal. When an accounting is to be made, each of the counters on each of the copiers must be examined and, again, the results manually recorded.

In the development of more sophisticated apparatus for monitoring the use of various devices and, in particular, photocopy machines, it is most important that the apparatus itself be relatively inexpensive and, additionally, that the information it provides be in an easily used form. Moreover, the monitoring apparatus should not necessarily detract from the ease with which the monitored device may be operated. Electrical counting and recording apparatus are, of course, desirable because of their extreme versatility. A great deal of information may be easily recorded and the information may be in a machine readable form able to be processed using conventional computer techniques. However, in order to reduce cost, it is desirable that a single recording device be capable of recording the use of a plurality of monitored devices. Moreover, it is desirable that the electrical interconnections between the single recording device and any apparatus associated with the individual monitored devices be kept as simple, and thus as economical, as possible. Further, it is important that the system be such that more than one of the monitored devices may be operated simultaneously without interfering with the monitoring functions.

SUMMARY OF THE INVENTION

There are provided by this invention apparatus for controlling and recording the use of monitored devices. Specifically, there are provided apparatus particularly useful with monitored devices such as photocopiers and comprising a terminal associated with each of the monitored photocopiers and a central recorder. When a user desires to use a monitored device, a communication link between the associated terminal and the central recorder is established and information regarding the user's identity is transmitted to the central recorder. The central recorder records the identification information and verifies the authorization of the user. If the user is authorized, the monitored device is enabled. The communication link between the terminal and the central recorder is then terminated. The user then makes his copies and the terminal counts the number made. When the user is finished, a communication link with the central recorder is reestablished and the number of copies is recorded.

It is an object of this invention to provide apparatus for monitoring the use of a plurality of devices.

It is an object of this invention to provide a monitoring system wherein only authorized users may make use of the monitored device and the usage thereof is recorded.

It is an object of the invention to provide a monitoring system wherein a single recording apparatus is used to record the usage of a plurality of monitored devices.

It is an object of this invention to provide a monitoring system using a single recording apparatus to record the usage of a plurality of monitored devices wherein a multiplicity of those devices may be operated simultaneously.

It is an object of this invention to provide a monitoring system which fulfills all of the above-mentioned objects and is characterized by economy of construction and use.

Further and additional objects will appear from this specification and the appended claims. Certain of the material disclosed but not claimed herein forms the subject matter of application Ser. No. 702,001 filed July 2, 1976 by Douglas R. Thornton and Jerome Smiglee entitled "Line-Seizing Apparatus".

DESCRIPTION OF THE DRAWING

FIG. 3 shows a badge for use with the terminal of FIG. 1;

FIG. 4 shows partly in block form and partly in schematic form the anti-contention circuit included in the terminal of FIG. 1; and FIG. 5 is a set of waveforms for explanation of the operation of the anti-contention circuit of FIG. 4.

DESCRIPTION OF THE PREFERRED EMBODIMENT

Figure 1:
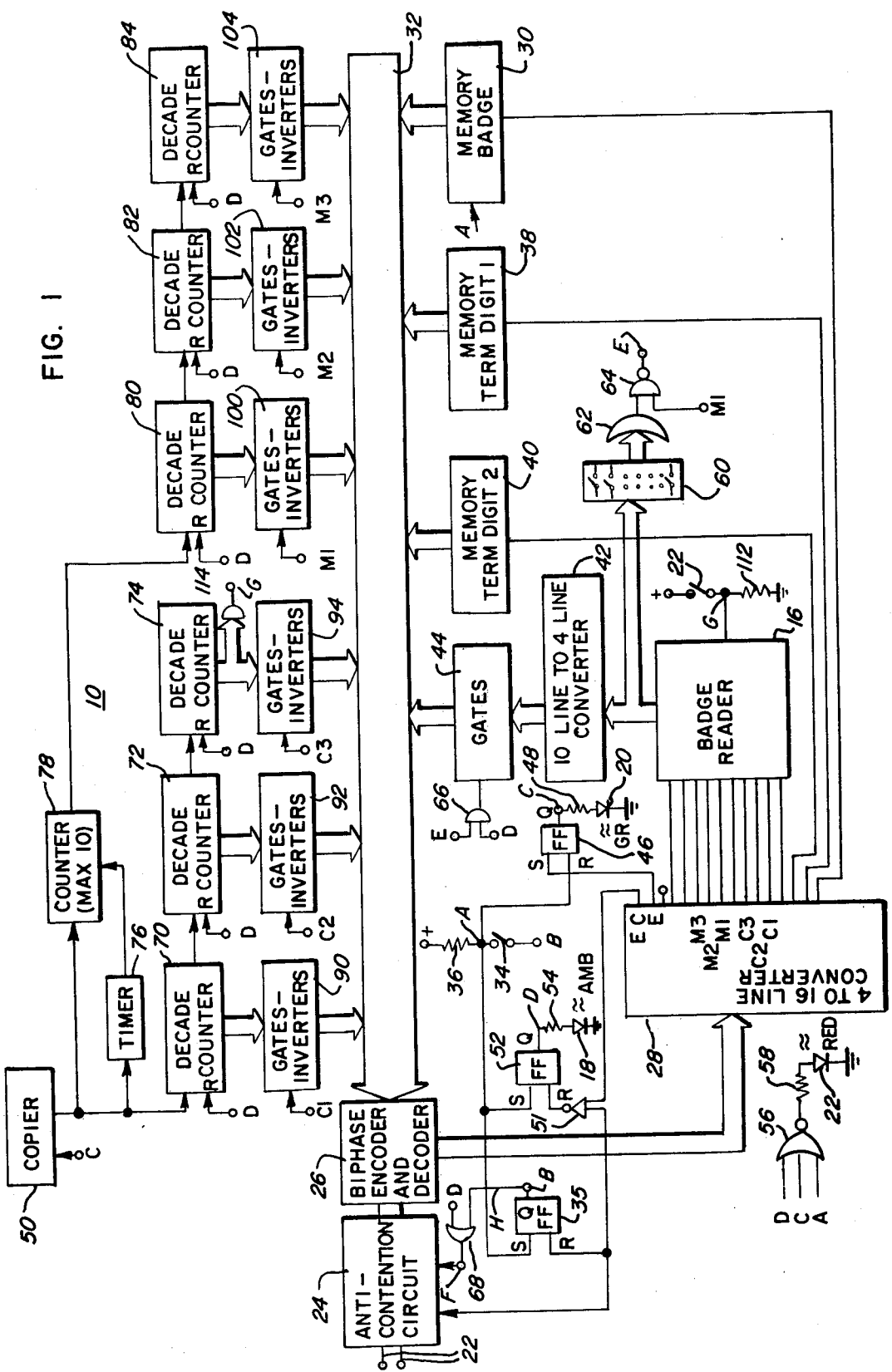
FIG. 1 shows partly in block form and partly in schematic form a terminal of one monitoring system of this invention.

There is disclosed in the drawing a use monitor and control system particularly adapted for use with photocopier machines. The use monitor and control system is comprised of a terminal unit 10 as disclosed in FIG. 1 and a central recording unit 12 as is disclosed in FIG. 2. One terminal unit 10 is used in association with each photocopy machine to be controlled. In any single usage of the apparatus of this invention it is normal to provide a single central recording unit 12 and a plurality of terminals 10 so that the usage of a like plurality of copiers may be monitored and controlled using a single central recorder.

The operation of the disclosed apparatus as viewed from the standpoint of a user of the controlled copier will first be explained. Each authorized user is provided with an identification card or badge 14 as is shown in FIG. 3. The badge includes a plurality of punched holes which may be located in a matrix of ten columns of ten rows, the possible matrix positions being indicated by the rectangles shown on the card. A single punched hole is located in each column and represents a decimal number. The numbers encoded on any single user's badge gives identifying information about the user and also provides security against the creation of counterfeit badges. In the system to be described, two columns on the card represent the user's department number, three columns represent a unique number within the user's department used to identify that individual user, one column represents the privilege level of the user, and the remaining four columns provide security. The security numbers may, for example, represent an identification number of the particular system with which the badge is to be used, some mathematical permutation of the remaining numbers on the badge, or a combination of these. The privilege level identification permits the control and monitor system to be arranged so that only certain individuals will be able to use certain ones of the controlled copiers.

Each terminal 10 includes a badge reader 16. When the user wishes to make copies, he places his badge into the badge reader. An amber light 18 located on the panel of terminal 10 is then lighted to inform the user that the terminal is in use and that he should wait until a green light 20 is lighted before attempting to make copies. A communication link between the terminal 10 and the central recorder 12 is then established and the information on the badge is read and transmitted to the central recorder as well as a number identifying the particular terminal 10. The central recorder 12 records the terminal number, department number, user identification number, and the present date and time of day on punched paper tape. The central recorder 12 also verifies the validity of the information on the badge and additionally verifies that the user is of the proper privilege level to use the associated copier. If the information is valid and the user has the proper privilege level, a signal is sent back to the terminal to enable the copier associated with the terminal, thus permitting the user to make the desired number of copies, and illuminating green light 20. The communication link between the terminal 10 and the central recorder 12 is then terminated. If the information on a badge inserted in the card reader is invalid or the user does not have the proper privilege level, a red light 22 on the terminal panel is illuminated to indicate that the copier will not be enabled. As the user makes his copies, two counts are kept at the terminal. The first represents the total number of copies made by the user and the second is a multiple copy count as will be subsequently explained. When the user finishes making his copies, he momentarily closes a switch 22 located on the terminal panel which causes his badge to be ejected from the badge reader. He may then take his card and leave; green light 20 is extinguished, and the copier is disabled. A communication link between the terminal 10 and central recorder 12 is then reestablished, and the terminal transmits the terminal number, the total copy count, and the multiple copy count to the central recorder where those numbers are recorded on the punched paper tape. The communication link between terminal 10 and central recorder 12 is then again terminated.

The basic operation of the system will be explained with reference to the table shown below.

| INQUIRY NUMBER | RESPONSE NUMBER | COUNTER STATUS | MEMORY | | | PUNCH | | |
|---|---|---|---|---|---|---|---|---|
| | | | | | LATCH | | LATCH | |
| | BADGE INSERTED | BADGE REMOVED | 0 | 1 | 2 | 0 | 1 | 2 |
| 0 | 1 | 2 | 1 | DA | DA | DA | FM | FM | FM |
| 1 | N ⎫ TERMINAL | N ⎫ TERMINAL | 2 | INI | DA | DA | 0 | 1 | 2 |
| 2 | ⎭ NUMBER | ⎭ NUMBER | 3 | IN2 | DA | DA | N ⎫ INSULATION NUMBER | N ⎫ TERMINAL NUMBER | N ⎫ TERMINAL NUMBER |
| | N | N | | | | | | | |
| 3 | N | | 4 | | DA,SEC | | N ⎭ | N ⎭ | N ⎭ |
| | ⎫ DEPT | | | | | | | | |
| 4 | N ⎭ NUMBER | N ⎫ | 5 | | DA,SEC | DA — | | N ⎫ DEPT NUMBER | |
| 5 | N | N ⎬ TOTAL COPY COUNT | 6 | | DA,SEC | DA — | | ⎭ NUMBER | N ⎫ |
| | ⎫ USER | | | | | | N | | ⎬ TOTAL COPY COUNT |
| 6 | N ⎬ NUMBER | N ⎭ | 7 | | DA,SEC | DA — | N ⎫ USER NUMBER | N ⎭ | |
| 7 | N ⎭ | | 8 | | DA,SEC | — | ⎭ | | |
| 8 | N ⎫ PRIVILEGE | N ⎫ | 9 | TC | TC,SEC, SECCL | DA — | N | | |
| 9 | N ⎬ NUMBER | ⎬ MULTIPLE COPY COUNT | 10 | TC | TC,SEC, | DA N ⎫ | N ⎫ | N ⎫ | |
| 10 | N ⎭ | N ⎭ | 11 | TC | TC,SEC | DA N | N | N | ⎬ MULTIPLE COPY COUNT |
| 11 | N ⎫ SECURITY NUMBER | | 12 | TC | TC,SEC | N ⎬ TIME CODE | N ⎬ TIME CODE | N ⎭ | |
| 12 | N ⎭ | | 13 | TC | TC,SEC | N | N | | |
| 13 | | | 14 | TC | TC | N | N | | |
| 14 | (ENABLE) | | 15 | TC | TC | N | N | | |
| 15 | (EOC) | (EOC) | 0 | FM | FM | FM N ⎭ | N ⎭ | | |

The first column of the table represents inquiry numbers transmitted from the recorder to the terminal, the second column represents the response numbers transmitted from the terminal to the recorder when there is a badge in the reader, and the third column represents the response numbers when the badge has been removed from the reader. Thus, when a badge is placed in the reader and communication established between terminal 10 and central recorder 12, central recorder 12 first transmits inquiry number 0 to the terminal. If a badge is in the reader, the terminal responds with a number 1; if the badge has been removed from the reader, the response number is 2. The central recorder then transmits successively inquiry numbers 1 through 15. The responses to inquiry numbers 1 and 2, whether or not a badge is in the reader, are two numbers identifying the particular terminal in use. When a badge is in the reader, the responses to inquiry numbers 3–12 represent the 10 digits on the inserted badge, inquiry numbers 13–15 elicit no response, but inquiry number 14 is a signal to the terminal that operation of its corresponding copier should be enabled, and inquiry number 15 is a signal to the terminal that the communication between the central recorder and the terminal is at an end. When the badge has been removed from the reader, the responses to inquiry numbers 4–6 represent the total copy count, the responses to inquiry numbers 8–10 represent a multiple copy count, inquiry numbers 3, 7, and 11–15 elicit no response, but inquiry number 15 is again a signal to the terminal that the communication between the central recorder and the terminal is at an end.

The terminal 10 of FIG. 1 will first be described. A positive logic level convention will be used throughout this specification with the abbreviations "LL0" and "LL1" meaning "logic level 0" and "logic level 1", respectively. A two-wire data line 22 is provided for coupling terminal 10 the central recorder 12. The data on line 22 is in bi-phase, four bit, serial form. The data on line 22 is coupled through an anti-contention circuit 24 to a bi-phase encoder and decoder circuit 26. The anti-contention circuit is effective to couple line 22 to encoder and decoder 26 at the appropriate times as will be more fully explained subsequently. For the present, it may be assumed that line 22 is directly connected to the circuit 26. The circuit 26 is effective both to convert the bi-phase, four bit serial information present on line 22 into four-bit, parallel information at its output and to convert four bit, parallel information at its input into bi-phase, four bit serial information on line 22. The bi-phase, serial data transmission system is also known as Manchester encoding. It is fully described at *Reference Data for Radio Engineers*, fifth edition, pages 32-21, published by International Telephone and Telegraph, New York, New York. An example of a circuit which may be used to perform the functions of circuit 26 is given in Alfke, "Exclusive OR Gates Simplify Modem Designs", *EDN Magazine*, Sept. 15, 1972, page 43.

The output of circuit 26 is in the form of four lines and is applied to the inputs of a 4 to 16 line converter 28. A 0 output of converter 28 is applied to a control input of a memory circuit 30. Memory circuit 30 has outputs coupled to a 4 line data bus 32 coupled to the input of bi-phase encoder and decoder circuit 26. When memory circuit 30 is enabled by application of an LL1 signal to the control input thereof, it is effective to apply a binary 1 to data bus 32 if a badge is inserted in badge reader 16 and a binary 2 to data bus 32 if no badge is inserted in badge reader 16. The badge reader 16 includes a switch symbolically represented at 34 and having one terminal coupled through a resistor 36 to a source of positive potential and the other coupled to the Q output of a set-reset, positive edge triggered flip-flop 35. Switch 34 is closed when a badge is inserted into badge reader 16 and is opened when a badge is removed therefrom. The junction of switch 34 and resistor 36 is labeled as circuit point A and the junction of switch 34 and the Q output of flip-flop 52 is labeled as circuit point B. That circuit point A is coupled to an input of memory 30 and is effective to appropriately control the binary number applied by memory 30 to data bus 32. The 1 and 2 outputs of converter 28 are coupled to control inputs of memory circuits 38 and 40, respectively. Memory circuits 38 and 40 have their outputs coupled to data bus 32 and are effective to apply 4 bit binary numbers to data bus 32 representing the first and second digits, respectively, of a terminal identification number when LL1 signals are applied to the control inputs thereof.

Outputs 3–12 of converter 28 are applied to 10 inputs of the badge reader 16. Outputs 3–5 and 8–10 are labeled C1–C3 and M1–M3, respectively, for reasons which will subsequently become apparent. Badge reader 16 has 10 outputs which are coupled to the inputs of a 10 line to 4 line converter 42. Badge reader 16 is such that when an LL1 signal is applied to the first input thereof, the first column of the badge within the reader is read and an LL1 signal appears at the output thereof corresponding to the row in which a punched hole appears in that first column. The second through tenth columns of the badge are similarly read when LL1 signals are applied to the second through tenth inputs, respectively, of badge reader 16. The converter 42 converts the decimal information at the outputs of badge reader 16 into binary information at its outputs. The outputs of converter 42 are coupled through a set of gates 44 to data bus 32. Gates 44 have a control input such that the outputs of converter 42 are applied to data bus 32 only when LL1 signal is applied to that control input. The 13 output of converter 28 is not used.

The 14 output of converter circuit 28 is labeled E as an abbreviation for "enable". It is coupled to the set input of a set-reset flip-flop 46. Circuit point A is coupled through an inverter 47 to the reset input of that flip-flop. The Q output of flip-flop 46 is coupled to a circuit point C. The circuit point C is coupled through a resistor 48 to the anode of a green light-emitting diode 20 having its cathode coupled to ground. Circuit point C is also coupled to a control input of a photocopier 50 associated with terminal 10. The photocopier 50 is such that an LL1 signal must be applied to the control input to enable operation of the copier. The 15 output of converter circuit is labeled EOC as an abbreviation for "end-of-communication". It is coupled through an inverter 51 to reset input of set-reset, negative edge triggered flip-flop 52 having its set input coupled to circuit point A. The Q output of flip-flop 52 is coupled to circuit point D which, in turn, is coupled through a resistor 54 to the anode of an amber light-emitting diode 18 having its cathode coupled to ground. The 15 output EOC of converter 28 is also coupled to the reset input of flip-flop 35 and circuit point A is coupled to the set input of that flip-flop.

A three input NOR gate 56 is provided having a first input coupled to circuit point A, a second input coupled to circuit point C, a third input coupled to circuit point D, and an output coupled through a resistor 58 to the anode of red light-emitting diode 22 having its cathode coupled to ground. Each of the outputs of badge reader 16 is additionally coupled through one switch in an array of switches shown diagrammatically at 60 to the inputs of an OR gate 62. The output of OR gate 62 is coupled to a first input of a two input NAND gate 64 having its second input coupled to the 8 output M1 of converter 28. The output of NAND gate 64 is coupled to circuit point E which, in turn, is coupled to a first input of a two input AND gate 66 having its second input coupled to circuit point D and its output coupled to the control input of gates 44. Circuit points B and D are coupled to two inputs of an OR gate 68. The output of OR gate 68 is coupled to circuit point F. Circuit point F is coupled to a first control input of anti-contention circit 24 and the 15 output EOC of converter 28 is coupled to the second output thereof. As will be explained subsequently, an LL1 signal at the first control input of the anti-contention circuit causes the creation of a communication link between the terminal and the central recorder and an LL1 signal at the second input thereof causes the termination of that communication link.

The circuitry of FIG. 1 as thus far described is operative to provide the operation previously described with reference to the second column of the above table. Prior to the time a badge is first inserted into badge reader 16, flip-flop 35 is reset and circuit point B is at LL0. When a badge is inserted into badge reader 16 and switch 34 closed, flip-flop 52 is set, circuit point D is placed at LL1, and amber light-emitting diode 18 is illuminated. When circuit point D goes to LL1, an LL1 signal to the first control input of anti-contention circuit 24 and a communication link with the central recorder is established. When inquiry numbers 0–12 are successively received on data line 22, LL1 signals are successively generated at outputs 0–12 of converter 28. The LL1 signals at converter outputs 0–2 cause memories 30, 38, and 40 to apply their respective response numbers to data bus 32. Further, since circuit point D is at LL1, when circuit point E is also at LL1, an LL1 signal is applied to the control inputs of gates 44 so that the outputs of converter 42 are coupled to data bus 32 and the LL1 signals at converter outputs 3–13 cause the numbers on the inserted badge to be successively applied to data bus 32. When an inquiry number 14 is received, an LL1 pulse is generated at the 14 output E of converter 28 setting flip-flop 46. With flip-flop 46 set, circuit point C is LL1, copier 50 is enabled, and green light-emitting diode 20 is illuminated. The user may then make the desired number of copies. Receipt of inquiry number 15 causes an LL1 pulse to be generated at the 15 output of converter 28 which is effective to reset flip-flop 52 extinguishing amber light-emitting diode 18 and which is also applied to the second control input of anti-contention circuit 24, thus terminating the communication link with the central recorder. It should be noted that red light-emitting diode 22 is not illuminated unless inquiry number 15 is received without the prior receipt of an inquiry number 14 as only then will each of circuit points A, C, and D simultaneously be at LL0.

Copier 50 includes an output at which is generated an LL1 pulse every time a copy is made thereon. That output is coupled to the counting input of the first one of a chain of three decade counters 70, 72, and 74. That output of copier 50 is also coupled to inputs of a timer circuit 76 and a counter 78. Timer 78 is such that its output is at LL0 unless its input has been at LL0 for a predetermined period of time, in which case at the end of that period an L11 pulse is generated at an output. Counter 78 is such that it counts to a maximum count of 10; when that count is reached, an LL1 pulse is generated at its output and the counter no longer counts the pulses applied thereto. The output of timer 76 is coupled to a reset input of counter 78 and is effective to reset counter 78 to zero. The output of counter 78 is coupled to the counting input of the first one of a chain of three decade counters 80, 82, and 84. The outputs of decade counters 70, 72, 74, 80, 82, and 84 are coupled through gate-inverters sets 90, 92, 94, 100, 102, and 104 to data bus 32. Each of the gate-inverter sets 90, 92, 94, 100, 102, and 104 includes a control input. They are each such that when an LL1 signal is applied to its control inputs, the counts present on its associated decade counter is inverted and applied to data bus 32. Each of decade counters 70, 72, 74, 80, 82, and 84 has a reset input such that when an LL1 signal is applied thereto, the counter is reset to zero. Those reset inputs are coupled to circuit point D.

Badge reader 16 has a badge eject input. If an LL1 signal is applied to it, the badge within the reader is ejected. The badge eject input is coupled to a circuit point G which, in turn, is coupled through switch 22 to a source of positive potential and through a resistor 112 to ground. The outputs of decade counter 74 representing binary counts 1 and 8 are coupled individually to the two inputs of a two input AND gate 114. The output of gate 114 is coupled to circuit point G. The 4-6 and 8-10 outputs of converter 28 are coupled to the control inputs of gate-inverter sets 90, 92, 94, 100, 102, and 104, respectively.

It will be apparent that decade counters 70, 72, and 74 count the total number of copies made on copier 50 during any one user's operation thereof. Decade counters 80, 82, and 84 form a count related to the number of multiple copies made from a single original. Specifically, the count contained in decade counters 80, 82, and 84 is advanced by one every time ten copies or more are made from a single original. Timer 76 is set so that counter 78 will be reset after a predetermined interval of time following the making of the last copy has elapsed. The length of that interval is substantially longer than that between operating cycles of copier 50 when it is making multiple copies from a single original but substantially shorter than that required for the original material in copier 50 to be changed.

When the user of copier 50 has completed making his copies, he momentarily closes switch 22 and his card is ejected. Switch 34 is then opened, flip-flop 46 is reset, and green light-emitting diode 20 is extinguished. Further, flip-flop 35 is set and an LL1 signal is applied through OR gate 68 to the first control input of anti-contention circuit 24 establishing a communication link with the central recorder. When inquiry numbers 0-2 are then received, memories 30, 38, and 34 apply their appropriate binary numbers to data bus 32. Further, when inquiry numbers 4-6 and 8-10 are received, the counts contained in decade counters 70, 72, 74, 80, 82, and 84 are successively applied to data bus 32 through their associated gae-inverter sets. When inquiry number 15 is received, flip-flop 35 is reset and an LL1 pulse is applied to the second control input of anti-contention circuit 24 terminating the communication link with the central recorder. When a badge is next inserted into reader 16, flip-flop 52 will again be reset and the resultant LL1 signal at its output will cause counters 70, 72, 74, 80, 82, and 84 to be reset to zero. It should be noted that with the counters thus reset, the gate-inverter sets 90, 92, 94, 100, 102, and 104 are operative to apply LL1 signals at all their outputs to data bus 32 when a badge is inserted in badge reader 16. Thus, when the badge numbers are read onto data bus 32, the outputs of gates 44 may still pull the appropriate lines of data bus 32 down to LL0. The counts in counters 70, 72, 74, 80, 82, and 84 will be inverted before they are applied to data bus 32. If it should happen that a badge is inserted into badge reader 16 prior to the counts in all of counters 70, 72, 74, 80, 82, and 84 being transmitted to the central recorder, i.e., prior to the receipt of inquiry number 15, then flip-flop 35 will remain set and the LL1 signal at its output will prevent circuit point A from going to LL0, thus preventing flip-flop 52 from being set and the count in the decade counters from being erased until after all the information is transmitted to the central recorder.

AND gate 114 prevents overflow of counters 70, 72, and 74. Without it, if more than 999 copies were made, the counts in those counters would go to zero, and the terminal would not record the making of the previous copies. However, the output of AND gate 114 goes to LL1 when the 900th copy is made which causes the badge within badge reader 16 to be ejected. The data contained within the terminal 10 is then recorded by the central recorder and the user may then reinsert his badge to commence making further copies. It will be apparent that although only provisions for counting and recording only six decimal digits are shown in the terminal of FIG. 1, it could easily be expanded to include four more digits.

Elements 60–66 provide the privilege level feature previously referred to. The output of NAND gate 64 will normally be at LL1 thus enabling the operation of gates 44 as previously described. If, however, the output of OR gate 62 is at LL1 at the same time the sixth column of the badge 14 is being read by the badge reader, then the output of gate 64 will be at LL0 and gates 44 will prevent the transmission of the privilege level digit to the central recorder. The switches in switch array 60 may be set so that only certain privilege levels will result in transmission of the privilege level digit to the central recorder. If it is desired that any particular privilege digit be prevented from operating the copier 50 associated with terminal 10, it is merely necessary to close the switch in array 60 coupling the corresponding output of badge reader 16 to the OR gate 62. As mentioned, the security numbers on the badge 14 may represent a mathematical permutation of the remaining numbers on the badge. When this is so, if the transmission of the privilege level digit is suppressed, then the circuitry at the central recorder for performing that permutation will not receive one digit, the permutation will give an incorrect result, the central recorder will respond as though the badge contained invalid data, and the corresponding copier will not be enabled. Thus, terminal 10 may be programmed so that it will not enable the associated copier 50 when the user's badge contains any selected privilege level numbers merely by closing the switches in array 60 corresponding to those numbers.

Figure 2:
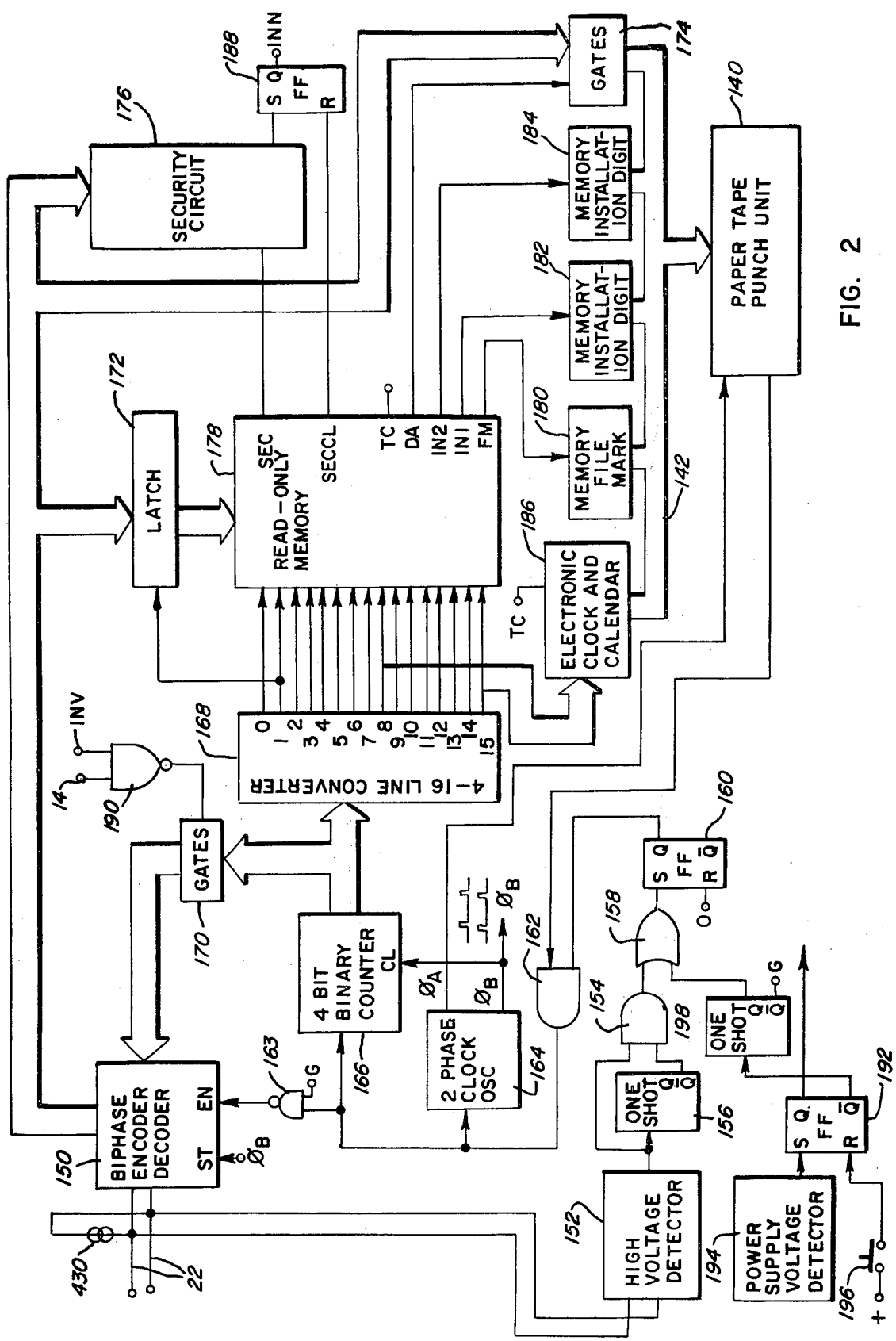
FIG. 2 shows partly in block form and partly in schematic form a central recorder for use with the terminal of FIG. 1.

A central recorder 12 is disclosed in FIG. 2. The central recorder 12 includes a paper tape punch and associated circuitry 140. Unit 140 has inputs coupled to a data bus 142 and a control input. When a positive going signal is applied to its control input, unit 140 is effective to transfer the information on bus 142 into the unit, encode the transferred information into a form suitable for recording on punched paper, and recording that information. The unit 140 includes an output which is normally at LL1, but goes to LL0 when unit 140 is enabled by the application of a positive going signal to the control input thereof and remains at LL1 until sufficient time has elapsed for the information on data bus 142 to be recorded.

Central recorder 12 further includes a bi-phase encoder and decoder circuit 150 which is coupled to data line 22 and is similar to the circuit 26 in terminal 10. The circuit 150 is effective both to convert the bi-phase, four bit serial information present on line 22 into four bit, parallel information at its output and to convert the four bit, parallel information at its input into bi-phase, four bit serial information on line 22. The circuit 150 additionally includes first and second control inputs labeled EN and ST, respectively, in FIG. 2. In order for the circuit 150 to be operative, an LL0 signal must first be applied to first control input EN to enable the operation thereof and a positive going signal must be applied to second control input ST in order to start its operation. Removal of the LL1 signal from the first control input EN will then disable circuit 150. The data line 22 is additionally coupled to the input of a relatively high voltage threshold detector circuit 152. That circuit has an output which is at LL1 only when the voltage across data line 22 is below a predetermined, relatively high, first voltage level. The magnitude of that first voltage level will become apparent from the subsequent description. The output of voltage detector 152 is applied to a first input of a two input AND gate 154 and to the input of a one-shot multivibrator circuit 156. An output Q of circuit 156 is coupled to the second input of AND gate 154. Circuit 156 is such that its Q output is normally at LL0, but when an LL1 signal is applied to the input, the Q output goes to LL1 for a predetermined period of time. The output of AND gate 154 is coupled to an input of an OR gate 158 having its output coupled to the set input of a set-reset flip-flop 160.

The Q output of flip-flop 160 is coupled to a first input of a two-input AND gate 162. The output of AND gate 162 is coupled to the first input of a two input NAND gate 163 having its output coupled to the first control input EN of bi-phase encoder and decoder circuit 150. The second input of AND gate 162 is coupled to the output of paper tape punch unit 140. The output of AND gate 162 is also coupled to control inputs of a two phase clock oscillator 164 and a four bit binary counter 166. Oscillator 164 has two outputs labeled $\phi A$ and $\phi B$ in FIG. 2. When an LL1 signal is applied to its control input, it emits a series of LL1 pulses at output $\phi A$ and a similar series of pulses at output $\phi B$, the pulses at output $\phi B$ slightly lagging those at output $\phi A$. Output $\phi A$ of oscillator 164 is coupled to the control input of paper tape punch unit 140. Counter 166 is such that when an LL1 signal is applied to its control input, it is effective to count the pulses applied to a counting input CL thereof, the state of the counter advancing on a negative going signal. The output $\phi B$ of oscillator 164 is coupled to the input CL of counter 166 so that the state of counter 166 is advanced on the trailing edge of the LL1 pulses in the $\phi B$ output of oscillator 164. The outputs of counter 166 are coupled both to the inputs of a 4 to 16 line converter 168 and through a set of gates 170 to the input of bi-phase encoder and decoder circuit 150. Gates 170 include a control input which is such that when an LL1 signal is applied thereto, the count present in counter 166 is applied to the input of circuit 150.

The apparatus of central recorder 12 as thus far described provides means for generating inquiry numbers 0–13 and 15 and applying them to data line 22. In order for central recorder 12 to be operative, flip-flop 160 must be set. With that flip-flop set and the output of unit 140 at LL1, the bi-phase encoder and decoder circuit 150, oscillator 164, and counter 166 are enabled. Oscillator 165 then generates an LL1 signal at its output $\phi A$ which causes unit 140 to record the data then present on data bus 142, the output of unit 140 to go low, and oscillator 164 to be disabled. Immediately following the generation of the LL1 pulse at output $\phi A$, a similar pulse is generated at the output $\phi B$. On the leading edge of that pulse, the operation of bi-phase encoder and decoder circuit 150 is commenced; on the trailing edge of that pulse, the count in counter 166 is advanced by one. The output of unit 140 remains at LL0 for a predetermined period of time. During that period three things are occurring. First, the data formerly present on data bus 42 is recorded by unit 140. Second, the data present at the input of the circuit 150 is converted into serial form and transmitted over data line 22 as an inquiry number. Third, data received on data line 22, the response number, is then generated at the output of circuit 150. After paper tape punch unit 140 has completed its recording operation, its output goes to LL1, the operation of oscillator 164 is again enabled, and the process is repeated. It should be noted that the period of time required for unit 140 to record the information at its input is longer than the period of time required for the bi-phase encoder and decoder circuit 150 to transmit an inquiry number to a terminal 10 and receive back a response number. Further, it should be noted that during intervals between successive LL1 pulses at output $\phi A$, the apparatus of the central recorder is recording data which is already present on data bus 142 but is inquiring of and receiving from a terminal 10 other data.

The apparatus for applying data to data bus 142 will now be described. The output of bi-phase encoder and decoder circuit 150 is applied to the inputs of a latch circuit 172, a set of gates 174, and a security circuit 176. Latch circuit 172 includes a control input. When the control input is at LL1, latch circuit 172 is effective to transfer the data at its inputs to its outputs, but when the control input is at LL0, it maintains the outputs at the states they had when the control input last changed to LL0. Four to 16 line converter 168 includes 16 outputs labeled 0–15, output 1 thereof being coupled to the control input of latch circuit 172. The 16 outputs of 4 to 16 line converter 168 and the outputs of latch circuit 172 are applied to inputs of a read only memory 178. Read only memory 178 includes seven outputs labeled SEC, SECCL, TC, DA, IN1, IN2, and FM in FIG. 2, those symbols being abbreviations for "security", "security-clear", "time code", "data", "installation digit 1", "installation digit 2", and "file maker", respectively. In the fourth column of the above table are shown the sixteen possible states of counter 166 while in the fifth through the seventh columns are indicated which of the outputs of memory 178 are at LL1 when the counter is in the corresponding state and depending on whether the output of latch circuit 172 is representative of a binary 0, 1, or 2.

The gates 174 have their outputs coupled to the data bus 142 and are such that when an LL1 signal is applied to a control input thereof, the signals at the output of the bi-phase encoder and decoder circuit 150 are applied to the data bus 142. The control input of gates 174 is coupled to the DA output of memory 178. Three further memories 180, 182, and 184 are also provided and each includes a control input and is such that when an LL1 signal is applied to its respective control input, a digit represented in binary form is applied to data line 142. The digit stored in memory 180 is a number representing a file marker which is to be recorded by the paper tape punch unit each time data is recorded thereby. The control input of memory 180 is coupled to the FM output of memory 178. The digits stored in memories 182 and 184 comprise a number representing an identification number assigned to a particular installation of a monitoring and control system. A single installation might have more than one central recorder and, thus, more than one central recorder might be assigned the same identification number. The control inputs of memories 182 and 184 are coupled to the outputs IN1 and IN2 of memory 178, respectively. An electronic clock and calendar 186 is provided which is capable of generating a seven digit, binary coded decimal number representing the current date and time. It includes a control input and, when an LL1 signal is applied to the control input thereof, a selected one of those seven digits is produced at the outputs, the identity of the selected digit being controlled by the input signals applied to seven address inputs of the clock and calendar 186. Those address inputs are coupled to outputs 8–15 of 4 to 16 line converter 168. The control input of clock and calendar 186 is coupled to the TC output of memory 178 and the outputs thereof are coupled to data bus 142.

Security circuit 176 includes appropriate apparatus for providing a security check on the data applied thereto. As mentioned previously, the badge 14 includes four digits which may be used in the security system. Security circuit 168 has a control input and when the circuit is enabled by application of an LL1 signal to that control input, the circuit is effective to perform the operations on the security digits and any other of the badge digits required for operation of the security system. Security circuit 176 may also be coupled to the outputs of clock 164 and converter 168 to provide proper timing signals for the operation thereof. The security circuit 176 may be of a variety of configurations depending upon the particular security system being used. As previously mentioned, the privilege level system of the apparatus described includes a security system which performs a mathematical permutation of all the digits on the badge. Thus, if the central recorder does not receive the privilege level digit, a correct result of the permutation is not achieved and the central recorder responds just as it would if the badge were invalid. In the circuit shown in FIG. 2, the security circuit 176 operates on all ten digits contained on badge 14.

The control input of security circuit 176 is coupled to the SEC output of memory 178. An output of security circuit 176 is normally at LL0 but when an invalid card is detected, that output changes to LL1. The output of security circuit 176 is coupled to the set input of a set-reset flip-flop 188. The reset input of that flip-flop is coupled to the SECCL output of memory 178. The Q output of flip-flop 188 is coupled to a first input of an NAND gate 190 while the 14 output of converter 168 is coupled to a second input of that NAND gate. The output of NAND gate 190 is coupled to the control input of gates 170.

The operation of central recorder 12 may be further described with reference to the above table. In the fourth column of that table is shown the state of counter 166 while the inquiry number indicated in the first column is being transmitted to the terminal 10 and the corresponding data is received from the terminal. Thus, while inquiry number 0 is being transmitted to the terminal and either the digit 1 or 2 received from the terminal depending on whether or not there is a badge inserted in the badge reader, counter 168 is in a state representing count 1. In the ninth and tenth columns of the table are stated the information which is recorded by the paper tape punch unit 140 during the corresponding counts of counter 166, the ninth column indicating the information recorded when the outputs of latch circuit 172 represent the digit 1 and the tenth column indicating the information recorded when the outputs of latch circuit 172 represent the digit 2.

Prior to the commencement of a communication with any terminal 10, counter 166 is at state 0 and memory 180 is enabled placing a binary number representative of a file mark on data bus 142. At the commencement of a communication, flip-flop 160 is set, and assuming the output of paper tape punch unit 140 is at LL1, oscillator 164 is enabled. An LL1 pulse is then generated at the $\phi A$ output of oscillator 164 which causes paper tape punch unit 140 to record a file marker. Immediately thereafter an LL1 pulse is generated at the $\phi B$ output of oscillator 164. The leading edge of that pulse causes the 0 count at the output of counter 164 to be transmitted to terminal 10 and the trailing edge causes the count in counter 164 to advance to 1. During the period that paper tape punch unit 140 is operative to record the file mark, its output is at LL0 and oscillator 164 is thus disabled. While counter 164 is in its 1 state, paper tape punch unit 140 completes the recording of the file mark and the response to inquiry number 0 is received, that response being either a 1 or 2 dependent upon whether a badge is inserted in the card reader of the terminal. While the counter 164 is in its 1 state, output DA of memory 178 is at LL1, gates 174 are enabled, and the response to inquiry number 0 is applied therethrough to data bus 142. Further, while the counter 164 is in its 1 state, output 1 of converter 168 is at LL1 so that the response to inquiry number 0 appears at the output of latch circuit 172.

After the paper tape punch unit 140 has completed recording the file mark, its output goes to LL1, oscillator 164 is again enabled and successive LL1 pulses again appear at its outputs $\phi A$ and $\phi B$. The $\phi A$ pulse causes the paper tape punch unit 140 to commence recording the information on data bus 142, i.e., the response to inquiry number 0, the leading edge of the $\phi B$ pulse causes the 1 output of counter 166 to be transmitted to terminal 10, and the trailing edge of $\phi B$ pulse causes the count in counter 166 to advance to 2. While the counter 164 is in its 2 state, the paper tape punch unit 140 completes the recording of the response to inquiry number 0 and the response to inquiry number 1 is received, that response being the first digit of the terminal identification number. While the counter 164 is in its 2 state, the output of latch circuit 172 remains at the state determined by the response to inquiry number 0 and the output DA of memory 178 is at LL1, gates 174 are enabled, and the response to inquiry number 1 is applied therethrough to data bus 142.

After the paper tape punch unit 140 has completed recording the response to inquiry number 0, the process is repeated and the paper tape punch unit 140 records the response to inquiry number 1 and inquiry number 2 is sent to the terminal 10 and the response thereto received and applied to data bus 142. When the output of latch circuit 172 is at 1, this process is repeated when the counter 168 is in states 3–8. While the counter is in states 4–8, the responses to inquiry numbers 3–7 are received indicating the department number and user number represented on the badge inserted into the badge reader. While the counter is in states 5–9, the responses to inquiry numbers 3–7 are recorded by the paper tape punch unit 140. When counter 166 is in states 9–14 the digits representing the badge priority and security numbers are received. There is normally no need for the paper tape punch unit to record those numbers. Instead, the clock and calendar unit 186 provides a time code representing the present date and time. Output TC of memory 178 is at LL1 when counter 166 is in states 9–15 and the seven digits in the output of clock and calendar unit 186 are accordingly recorded when counter 166 is in states 10–15 and 0.

Still considering the situation when the output of latch circuit 172 is at 1, output SEC of memory 178 is at LL1 when counter 166 is in states 4–13. Thus, the digits received from terminal 10 while the counter is in states 4–13, i.e., all the digits read from the badge, are applied to security circuit 176. If the output of security circuit 176 goes to LL1 indicating an invalid badge has been used, then the central recorder must not transmit inquiry number 14 to the terminal. Elements 188 and 190 provide this function. Normally the Q output of flip-flop 188 is at LL0. Thus, an LL1 signal is generated at the output of NAND gate 190 and applied to the control inputs of gates 170 so that the output of counter 166 is applied to the input of bi-phase encoder and decoder circuit 150. When data representing an invalid badge is received, the output of security circuit 176 goes to LL1 setting flip-flop 188 and placing its Q output at LL1. In this situation, when the output 14 of counter 166 is at LL1, the output of NAND gate 190 is at LL0 and gates 170 are disabled disconnecting the output of counter 166 from the input of circuit 150 and preventing transmission of inquiry number 14. Following flip-flop 188 being set, it is necessary to reset that flip-flop when the time information read from another badge is received. This is achieved by providing output SECCL from memory 178 which is at LL1 when counter 166 is in state 9 and coupling it to the reset input of flip-flop 188.

In order to terminate the operation of the central recorder after all the information from the badge has been received and the complete time code recorded, the 0 output of converter 168 is coupled to the reset input of flip-flop 160. When couner 166 is advanced through all of counts 1–15 and returns to 0, inquiry number 15 is then transmitted to the terminal and memory 180 is enabled to permit the recording of a file mark the next time a communication with a terminal is commenced. In summary, when a badge is inserted in the badge reader, the paper tape punch unit 140 is effective to record a file mark followed by the digit 1, five digits identifying the user, and seven digits stating the date and time.

When the output of latch circuit 172 is at 2, the operation of the central recorder is similar to that described in the three immediately preceeding paragraphs, except the time code is not recorded and the security circuit 176 is not enabled. Instead, the total copy count digits and the multiple copy count digits received from the terminal are recorded. In this case, the paper tape punch unit 140 records a file mark followed by the digit 2, three digits representing the total copy count, and three digits representing the multiple copy count.

The central recorder 12 also includes apparatus for recording a two digit installation identification number and the date and time every time its operation is initiated. That apparatus includes a set-reset flip-flop 192 having its set input coupled to the output of a power supply voltage detector 194 and its reset input coupled through a switch 196 to a source of positive voltage. Power supply voltage detector 194 is coupled to the circuitry for supplying power to the central recorder and its output is at LL0 when the power supply output voltage is below that required to operate the central recorder and is otherwise at LL1. Switch 196 is located on the front panel of the central recorder and must be temporarily closed every time the operation of the central recorder is commenced, i.e., either when power is applied thereto or after the paper tape supply in paper tape punch unit 140 has been replenished. The Q output of flip-flop 192 is applied to the reset inputs of flip-flops 160 and 188, insuring that both those flip-flops are initially reset when power is applied to the central recorder, and to a clear input of counter 166, resetting that counter to 0 when power is applied to the central recorder. The $\overline{Q}$ output of flip-flop 192 is coupled to the input of a single-shot multivibrator 198. The Q output of single-shot multivibrator 198 is applied to the second input of OR gate 158 and is normally at LL0 except during a period of time of predetermined length following the application of an LL1 signal to its input. The $\overline{Q}$ output of single-shot multivibrator 198 is coupled to a circuit point G which, in turn, is coupled to the second input of NAND gate 163. Each time switch 196 is closed, the the multivibrator applies an LL1 signal through gate 158 to th set input of flip-flop 160. An LL0 signal is correspondingly applied from the one-shot multivibrator to the second input of NAND gate 163 so that an LL1 signal is applied to the second control input EN of bi-phase encoder and decoder circuit 150 disabling the operation thereof. With flip-flop 160 set, the central recorder starts to operate. However, since circuit 150 is disabled, no inquiry numbers are sent to the terminals and no responses are received therefrom. Thus, the output of latch circuit 172 is maintained at 0. The states of the outputs of the memory 178 and the numbers recorded by paper tape punch unit 140 in this situation are represented in the fifth and eighth columns of the above table, respectively. While counter 166 is in states 1 and 2, a file mark and the digit 0 are recorded. When counter 166 is in states 2 and 3, outputs IN1 and IN2, respectively, of memory 178 are at LL1 and memories 182 and 184, respectively, are enabled thereby so that signals representative of the first and second installation identification digits, respectively, are applied to data bus 142. When counter 166 is in states 3 and 4, first and second installation identification digits, respectively, are recorded. When counter 166 is in states 10–15 and 0, the seven digit time code is recorded. The period of one-shot multivibrator 198 should be slightly longer than the time required for the paper tape punch unit 140 to record the file mark. Thus, whenever the operation of central recorder 12 is initiated by closing of switch 196, the paper tape punch unit 140 records a file mark, the digit 0, a two digit number identifying the central recorder installation number, and a seven digit code representing the date and time.

As previously mentioned, terminal 10 includes anti-contention circuit 24. The purpose of that circuit is to permit the use of one central recorder to control and monitor the use of a plurality of copiers with each copier having a terminal 10 associated therewith. Specifically, it provides that a single, two-wire data line 22 may be used to couple all the terminals associated with a single central recorder to that recorder, the separate terminals being connected in parallel across the line, and insures that only one terminal will communicate with the central recorder at one time.

The anti-contention circuit will be described with reference to FIG. 4. Each terminal 10 associated with central recorder 12 includes an anti-contention circuit 24. A first anti-contention circuit 24 associated with a first terminal 10 is disclosed in FIG. 4 while a second anti-contention circuit 24A associated with a second terminal 10A is partially shown. Circuits 24 and 24A may be virtually identical. One side of data line 22 is coupled to circuit ground while the other side is coupled to an input of a relatively high voltage threshold detector 400 and an input of a relatively low voltage threshold detector 402. The output of threshold detector 400 is at LL1 when the voltage across data line 22 exceeds a first voltage level and is otherwise at LL0, whereas the output of threshold detector 402 is at LL1 when the voltage across data line 22 exceeds a second voltage level and is otherwise at LL0, the first voltage level being greater than the second. The output of voltage detector 400 is coupled to a first input of a two input AND gate 404. A J-K flip-flop 406 is provided having its J input coupled to the output of gate 404, its K input coupled to ground, and its clock input coupled to the output of an oscillator 408. The Q output of flip-flop 406 is coupled to a load switch 410 having an output coupled through a resistor 412 to the ungrounded side of data line 22. Load switch 410 is effective to couple the ungrounded side of data line 22 to ground through resistor 412 when an LL1 signal is present at its input. The Q output of flip-flop 406 is also coupled to the input of a timer circuit 414. An output of timer 414 is normally at LL1 but goes to LL0 when the signal at its input has been at LL1 for a predetermined interval of time. The output of timer 414 is coupled to the first input of a two-input AND gate 416 and the output of that gate is coupled to a first input of a two-input OR gate 418. The output of voltage detector 402 is coupled through an inverter 420 to the second input of AND gate 416. The second input of OR gate 418 is coupled to the 15 output EOC of converter 28 in terminal 10. The second input of AND gate 404 is coupled to circuit point F in terminal 10. As mentioned, anti-contention circuit 24A is similar to circuit 24 and, specifically, includes a load switch 410A and a resistor 412A connected just as are the corresponding elements in circuit 24. However, the oscillator in circuit 24A corresponding to oscillator 408 in circuit 24 operates at a slightly different frequency than oscillator 408. The central recorder 12 includes a current source 430 coupled between data lines 22. That current source and elements 152, 154, and 156 in the central recorder 12 cooperate with the anti-contention circuit 24 to perform the desired function.

Data is transmitted over data line 22 by zero volt pulses. The anti-contention circuit 24 also includes a data switch represented at 422 and coupled between the nongrounded side of data line 22 and ground. When an LL1 signal is applied to an input thereof, the data switch is closed causing a zero volt signal to appear across the data line. The input of data switch is coupled to the output of a two input NOR gate 424 having a first input coupled to the junction of load switch 410 and resistor 412. The data to be transmitted is applied from the bi-phase encoder and decoder circuit 26 to the second input of NOR gate 424, whereas the data received is applied from the output of relatively low voltage detector 402 to the bi-phase encoder and decoder circuit 26.

In brief, the anti-contention circuits operate as follows. The current source 430 within central recorder 12 provides a relatively fixed current flow between the sides of data line 22 so that, at least when no data is being transmitted over the data line, the voltage between the two sides is a function of the resistance between them. When communication between any terminal 10 and the central recorder 12 is established, the corresponding load switch 410 in that recorder is closed and the associated resistor 412 is placed across the data line 22. When the load switches 410 in each terminal 10 associated with a single central recorder are open, the voltage across data line 22 central recorder are open, the voltage across data line 22 will be at a high, open circuit voltage determined primarily by the internal resistance of the current generator 430. When the switch 410 associated with one of the terminals is closed, the presence of the resistor 412 across the data line causes the voltage thereacross to fall below a first voltage level. Relatively high voltage threshold detector 400 detects whether the voltage across the data line is above or below that first voltage level. If the load switches 410 associated with two or more terminals should ever be closed at the same time, two or more resistors 412 are thereby placed across data line 22 causing the voltage to fall below a second voltage level lower than the first voltage level. Relatively low voltage threshold detector 402 detects whether the voltage across the data line is above or below the second voltage. When the output of detector 400 is at LL1, the terminal is permitted to establish a communication link with the central recorder and the load switch 410 is closed. When the output of detector 400 is at LL0, another terminal has already established a communication link with the central recorder and terminal 10 is not permitted to establish such a communication link until the previously established link is terminated. If it should happen that load switches 410 and 410A of both terminals 10 and 10A are closed, then the voltage across data line 22 will fall below the second voltage level. Voltage detector 22 detects the occurrence of this condition and terminates the communication links between both of terminals 10 and 10A and the central recorder. A pseudo random system making use of oscillator 408 in the terminals is then used to establish a communication link with one of the terminals.

In greater detail, when a badge is inserted into badge reader 16 and switch 34 is closed, flip-flop 52 is set, and circuit point F is placed at LL1. If the output of voltage detector 400 is at LL1, flip-flop 406 is then set at the next time a pulse is applied to its clock input from oscillator 408 and load switch 410 is closed. An LL0 signal is then applied to the first input of NOR gate 424 and data switch 422 is opened and closed in response to the signal present at the second input of that gate, thus establishing a communication link between terminal 10 and the central recorder. If, on the other hand, the output of voltage detector 400 is at LL0, no such communication link is established until that output changes to LL1 when any previously established communication link with another terminal has been terminated. Similarly, when a badge is removed from badge reader 16, switch 34 is opened, flip-flop 35 is set, and circuit point F goes to LL1. If the output of voltage detector 400 is at LL1, flip-flop 409 is set and load switch 410 is closed establishing a communication link with the central recorder 12. If the output of voltage detector 400 is at LL0, no communication link is established until it changes to LL1. When inquiry number 15 is received by the terminal indicating the end of a communication, an LL1 signal is applied from the EOC output 15 of converter 28 to the reset input of flip-flop 406 causing load switch 410 to open and terminating the communication link with the central recorder.

In FIG. 5 there are shown exemplary waveforms for purposes of further explanation of the operation of the anti-contention circuit. Waveform A represents the output of oscillator 408, waveform B the signal at circuit point F when it is desired to establish a communication link between terminal 10 and the central recorder 12, and waveform C represents the output of flip-flop 406. Waveforms D, E, and F correspond to waveforms A, B, and C, respectively, but represent the signals present in anti-contention circuit 24A. As may be seen from comparing waveforms B and E, the signal at circuit point F in circuit 24 goes to LL1 prior to the signal at the corresponding circuit point F in circuit 24A going positive, indicating that terminal 10 attempted to establish communication with the central recorder prior to terminal 10A doing so. Thus, the output of flip-flop 406A stays at LL0 until after the termination of the communication link between terminal 10 and the central recorder.

Waveforms G-K of FIG. 5 illustrate the operation of the anti-contention circuit when both terminals 10 and 10A attempt to establish communication links with the central recorder 12 at the same time, waveforms G-J representing the output of oscillator 408 and the signal at circuit point F in circuit 24 and the output of corresponding oscillator 408A and the signal at the corresponding circuit point F in circuit 24A, respectively, and waveform K represents the corresponding voltage across data line 22. This situation occurs when the generators 408 and 408A in the terminals 10 and 10A happen to be approximately in phase and the signals at circuit point F in both terminals 10 and 10A go to LL1 during the time period between the same two corresponding output pulses of oscillators 408 and 408A, those two pulses being shown in FIG. 5 as occurring at approximately times $t_1$ and $t_2$. When this occurs, the load switches 410 and 410A in both circuits 24 and 24A are closed at approximately $t_2$ and, as shown at waveform K, the voltage across data line 22 falls below the second voltage level indicated as V2. With the data line voltage below V2, an LL1 signal is applied through AND gate 416, the output of timer 414 being at LL1, and OR gate 418 to reset the flip-flop 406 and open load switch 410. The load switch 410A is likewise opened. As mentioned, the oscillators in circuits 24A and 24B operate at different frequencies. As illustrated in FIG. 5, the frequency of the oscillator in circuit 24 is slightly less than that of the oscillator in circuit 24A. At the next occurrence of an output pulse from oscillator 408, indicated in FIG. 6 as occurring at $t_3$, the pulses from oscillator 408 and 408A are somewhat out of phase and the LL1 pulse from oscillator 408 commences slightly prior to the LL1 pulse from oscillator 408. However, the system including load switch 410A, voltage detector 400, and AND gate 404 has a response period which must elapse after the closure of load switch 410A to inhibit the closing of load switch 410. If the onset of LL1 pulses from oscillator 408 and 408A are not separated by at least that response period, load switch 410 will close even though load switch 410A has previously closed which will again result in the data line voltage falling below V2 and both load switches 410 and 410A being opened. In FIG. 5, commencement of the output pulses from oscillator 408 occurring at $t_3$, $t_4$, $t_5$, and $t_6$ are shown as being separated by periods of time less than the required response time. However, by the time pulse $t_7$ from oscillator 408 commences, the commencement of the LL1 pulses from oscillators 408 and 408A are sufficiently separated that load switch 410 is prevented from closing. In this case, the data line voltage remains above V2 and load switch 410A remains closed permitting communication between the terminal 10A and the central recorder.

The fall of the line voltage below the first voltage level is detected by high voltage detector 152 in central recorder 12 and flip-flop 160 is thus set to commence the operation of the central recorder as previously described. Single-shot multivibrator 156 provides a delay period between the fall of the data line voltage below the first voltage level and the commencement of operation of the central recorder. This insures that neither low voltage noise pulses on data line 22 nor the low voltage pulses resulting from the operation of the anti-contention circuit as shown in waveform K of FIG. 5 will be operative to trigger operation of the central recorder.

Timer 414 is provided in anti-contention circuit 24 so that data pulses intended for terminal 10 will not be effective to reset flip-flop 406 and open load switch 410. Thus, after the output of flip-flop 406 has been at LL1 for a predetermined interval of time, the output of timer 414 goes to LL0 so that the output of voltage detector 402 may no longer be applied through gate 416 to the reset input of flip-flop 406. Low voltage detector 402 is then used to detect data pulses on data line 22.

In one apparatus constructed using this invention, the oscillators 408 in the anti-contention circuits had frequencies of approximately 10 Hz., and the LL1 pulses generated at the outputs thereof had a duration of approximately 0.5 milliseconds, timer 414 had a delay period of approximately 6 milliseconds, and single-shot circuit 156 had a period of approximately 40 milliseconds. It is, of course, desirable to insure that in all of the terminals 10 used with any single central recorder 12 the frequencies of operation of the oscillators 408 are slightly different.

It will thus be seen that a multiterminal monitoring system has been provided which fulfills each of the above-mentioned objects. While a particular embodiment of this invention has been disclosed, it will be understood, of course, that the invention is not to be limited thereto. Many modifications are possible to the general arrangement of the apparatus disclosed and, similarly, many modifications are possible to the detailed circuits disclosed. It is, for example, possible to use the monitoring apparatus disclosed either simply as a use recording system by essentially eliminating the security circuit 176 of the central recorder. It will be obvious that many further modifications of the specific embodiment may be made which make use of this invention. It is contemplated, therefore, by the appended claims, to cover any such modifications as fall within the true spirit and scope of this invention.

I claim:

1. Apparatus for monitoring the use of a plurality of controlled devices comprising a plurality of terminals and a central recorder, one terminal being associated with each of said devices and each of said terminals comprising:

first means for receiving and removing user identification information;

second means for establishing a communication link between the terminal and said central recorder when user identification information is received by said first means and when user identification is removed from said first means;

third means coupled to the associated device for counting the uses of said device;

fourth means coupled to said first, second, and third means for transmitting said user identification information to said central recorder when user identification information is received by said first means and transmitting said use count to said central recorder when said user identification information is removed from said first means; and fifth means coupled to said second means for terminating the communication link between said terminal and said central recorder at the conclusion of the transmission of said user identification information to said central recorder and at the conclusion of the transmission of said use count to said central recorder.

2. Apparatus for monitoring the use of a plurality of controlled devices comprising a plurality of terminals and a central recorder, one terminal being associated with each of said devices and each of said terminals comprising:

first means for receiving a badge bearing user identification information and reading said information;

second means for establishing a communication link between the terminal and said central recorder when a badge is received by said first means and when a badge is removed from said first means;

third means coupled to the associated device for counting the uses of said device;

fourth means coupled to said first, second, and third means for transmitting said user identification information to said central recorder when a badge is received by said first means and transmitting said use count to said central recorder when a badge is removed from said first means; and fifth means coupled to said second means for terminating the communication link between said terminal and said central recorder at the conclusion of the transmission of said user identification information to said central recorder and at the conclusion of the transmission of said use count to said central recorder.

3. The apparatus of claim 1 wherein said central recorder comprises apparatus for recording said user identification information and said use count.

4. Apparatus for monitoring the use of a plurality of controlled devices comprising a plurality of terminals and a central recorder, one terminal being associated with each of said devices and each of said terminals comprising:

first means for receiving a badge bearing user identification information;

second means for establishing a communication link between the terminal and said central recorder when a badge is received by said first means and when a badge is removed from said first means;

third means coupled to said second means and the associated device for enabling the operation of said associated device in response to a first signal from said central recorder and disabling the operation of said associated device in response to the removal of a badge from said first means;

fourth means coupled to said first and second means for transmitting said user identification information to said central recorder when a badge is received by said first means and transmitting said use count to said central recorder when a badge is removed from said first means; and fifth means coupled to said second means for terminating the communication link between said terminal and said central recorder at the conclusion of the transmission of said user identification information to said central recorder and at the conclusion of the transmission of said use count to said central recorder;

and said central recorder comprising:

sixth means for verifying the validity of the user identification information received from said terminal; and seventh means coupled to said sixth means for transmitting said first signal to a terminal in response to the receipt of valid user identification information.

5. Apparatus for monitoring the use of a plurality of controlled devices comprising a plurality of terminals and a central recorder, one terminal being associated with each of said devices and each of said terminals comprising:

first means for receiving a badge bearing user identification information and reading said information;

second means coupled to said first means and establishing a communication link between the terminal and said central recorder when a badge is received by said first means and when a badge is removed from said first means;

third means coupled to said second means for receiving inquiry number signals from said central recorder in response to the establishment of a communication link with said central recorder and transmitting response number signals to said central recorder; and fourth means coupled to said second and third means for terminating the communication link between said terminal and said central recorder at the conclusion of the transmission of said response numbers to said central recorder.

6. The apparatus of claim 5 wherein said third means is further coupled to said first means and said response number signals represent said user identification information when a badge is received by said first means and said response number signals represent said use count when a badge is removed from said first means.

7. The apparatus of claim 6 wherein one of said response number signals further represents whether a badge is received in said first means.

8. The apparatus of claim 7 wherein said central recorder includes fifth means for recording the responses represented by at least one of said response number signals.

9. The apparatus of claim 8 wherein said central recorder further comprises sixth means for verifying the validity of the user identification information and seventh means coupled to sixth means for enabling the operation of said sixth means only when said one of said response number signals indicates that a badge is received within said first means.

10. The apparatus of claim 9 wherein said terminal further comprises eighth means coupled to said second means and the associated device for enabling the operation of said associated device in response to a first inquiry number signal from said central recorder and said central recorder further comprises ninth means coupled to said sixth means for transmitting said first inquiry number signal to a terminal in response to valid user identification information.

11. The apparatus of claim 10 wherein said associated devices are copying machines.

* * * * *